United States Patent
Geerits

(10) Patent No.: US 8,130,591 B2
(45) Date of Patent: Mar. 6, 2012

(54) DOWNHOLE MEASUREMENTS OF MUD ACOUSTIC VELOCITY

(75) Inventor: Tim W. Geerits, Niedersachsen (DE)

(73) Assignee: Baker Hughes Incorporated, Houston, TX (US)

( * ) Notice: Subject to any disclaimer, the term of this patent is extended or adjusted under 35 U.S.C. 154(b) by 805 days.

(21) Appl. No.: 12/192,712

(22) Filed: Aug. 15, 2008

(65) Prior Publication Data

US 2009/0196120 A1 Aug. 6, 2009

Related U.S. Application Data

(60) Provisional application No. 60/968,758, filed on Aug. 29, 2007.

(51) Int. Cl.
*G01V 1/00* (2006.01)

(52) U.S. Cl. ............................................. 367/35; 367/25

(58) Field of Classification Search ...................... 367/25, 367/35; 73/152.46
See application file for complete search history.

(56) References Cited

U.S. PATENT DOCUMENTS

| | | | |
|---|---|---|---|
| 5,341,345 A | | 8/1994 | Warner et al. |
| 5,485,431 A | * | 1/1996 | Johnson et al. ............... 367/30 |
| 6,584,837 B2 | | 7/2003 | Kurkoski |
| 6,611,761 B2 | * | 8/2003 | Sinha et al. ................ 702/6 |
| 6,618,322 B1 | | 9/2003 | Georgi |
| 7,129,477 B2 | | 10/2006 | Schneider et al. |
| 2004/0034474 A1 | | 2/2004 | Herron et al. |
| 2005/0034530 A1 | | 2/2005 | Han et al. |
| 2006/0133205 A1 | * | 6/2006 | Van Kuijk et al. ........... 367/35 |
| 2009/0257307 A1 | * | 10/2009 | Valero et al. ................ 367/31 |

OTHER PUBLICATIONS

K. C. Leurer; "Attenuation in fine-grained marine sediments: Extension of the Blot-Stoll model by the "effective grain model" (EGM)," Geophysics, vol. 62, No. 5, XP002485876, Sep. 1, 1997, pp. 1465-1479.

Molz; "Mud Velocity Corrections for High Accuracy Standoff/Caliper Measurements," SPWLA 41st Annual Logging Symposium, Paper P, Jun. 4-7, 2000, pp. 1-14.

* cited by examiner

*Primary Examiner* — Mark Hellner
(74) *Attorney, Agent, or Firm* — Mossman Kumar & Tyler PC

(57) ABSTRACT

One or more acoustic transducers are used to measure ultrasonic velocities in the mud in the interior channel of a drill collar. Corrections may be applied for temperature and/or fine grain drill cuttings to get the ultrasonic velocity in the annulus between the drill collar and the borehole wall. The latter velocity may be used for caliper measurements and for correcting measurements made by formation evaluation sensors.

19 Claims, 2 Drawing Sheets

DOWNHOLE MEASUREMENTS OF MUD ACOUSTIC VELOCITY

CROSS-REFERENCES TO RELATED APPLICATIONS

This application claims priority from U.S. Provisional Patent Application Ser. No. 60/968,758 filed on Aug. 29, 2007.

BACKGROUND OF THE DISCLOSURE

1. Field of the Disclosure

The disclosure relates to the field of acoustic measurement devices in oil exploration. Specifically, the disclosure is a method of measuring ultrasound velocity in drilling mud in a borehole formation.

2. Background of the Art

Borehole caliper is an important factor in the available accuracy and effectiveness of downhole data gathering instruments. Spatial irregularities in the borehole walls can adversely affect data integrity, unless these irregularities are detected and accounted for in data processing and/or acquisition. Borehole rugosity adversely affects downhole data measurements which are designed to assess the potential for hydrocarbon bearing formations adjacent a borehole. For example, cavities in the borehole wall can adversely affect measurements taken by downhole devices such as Nuclear Magnetic Resonance (NMR) devices. Thus, there is a need for an accurate downhole measurement of borehole rugosity. Resistivity measurements and gamma ray density measurements are also sensitive to the borehole size shape and standoff.

Ultrasonic pulse-echo measurements have long been used in wireline and logging-while-drilling (LWD) tools to measure a variety of parameters including instantaneous standoff, borehole caliper, or features on the borehole wall such as rugosity, fractures, or cracks.

The working principle for these downhole applications involves mounting one or more highly mechanically damped ultrasonic transducers on an (LWD) tool for use during a drilling operation. The transducer emits a short duration broadband pulse. The pulse then reflects from the surface being probed and returns and re-excites the emitting transducer. The transducer is positioned such that at least some of the acoustic pulse propagates through the surrounding manmade borehole fluid, commonly referred to as drilling mud.

Inaccuracy in the exact value of ultrasound velocity in the borehole fluids limits the accuracy of the measurement. The transit time $\tau$ for the echo determines the distance D to the reflecting surface. $D=V_{mud}*\tau$. However, the accuracy of the conversion from transit time to distance traveled is limited by the accuracy of the value of ultrasound velocity in the drilling mud, $V_{mud}$. The ultrasound velocity in standard drilling mud is usually within 20% of that of water (1493 m/sec). Thus the propagation distance may have 20% inaccuracy. Higher accuracy is often required.

To date, measurement of ultrasonic sound velocity in drilling mud has been made using pulse transmission techniques in which acoustic pulses are transmitted through the drilling mud in the annulus between the drill collar and the borehole wall. See, for example, U.S. patent application Ser. No. 10/298,706 of Hassan et al., and U.S. Pat. No. 6,618,322 to Georgi et al., both having the same assignee as the present disclosure and the contents of which are incorporated herein by reference.

Pulse transmission techniques in the annulus are difficult to make. First, the drill cuttings being brought up by the drilling mud in the annulus include relatively large particles which scatter and attenuate the pulses. Consequently, the pulses received by the receiver are decreased in amplitude and include a lot of scattered noise. The drill cuttings are also highly abrasive leading to rapid wear and tear on the transducers. In configurations in which the transducers are positioned behind an acoustic window, the window itself can give rise to reverberations.

The disclosure herein discloses methods to measure ultrasound velocity and attenuation in drilling mud in an LWD environment. The device is particularly useful in applications where real-time mud velocity corrections are needed and cannot be applied after LWD tool use.

SUMMARY OF THE DISCLOSURE

One embodiment of the disclosure is an apparatus for evaluating an earth formation. The apparatus includes a bottomhole assembly (BHA) configured to be conveyed into a borehole, at least one acoustic transducer in an interior channel of the BHA configured to make a measurement indicative of a value of a first velocity of a compressional wave in a fluid in the interior channel, and a processor configured to use the measurement made by the at least one acoustic transducer to estimate a value of a second velocity of a compressional wave in a fluid in an annulus between the BHA and a wall of the borehole.

Another embodiment of the disclosure is a method of evaluating an earth formation. The method includes making a measurement indicative of a first velocity of a compressional wave in a fluid in an interior channel of a bottomhole assembly (BHA) in a borehole, and using the measurement indicative of the first velocity to estimate a value of a second velocity of a compressional wave in a fluid in an annulus between the BHA and a wall of the borehole.

Another embodiment of the disclosure is a computer-readable medium accessible to a processor, the computer-readable medium including instructions that enable the processor to use a measurement indicative of a first velocity of a compressional wave in an interior channel of a bottomhole assembly (BHA) conveyed in a borehole to estimate a value of a second velocity of a compressional wave between the BHA and a wall of the borehole.

BRIEF DESCRIPTION OF THE DRAWINGS

The present disclosure is best understood with reference to the accompanying drawings in which like numerals refer to like elements and in which.

DESCRIPTION OF THE DISCLOSURE

Figure 1:
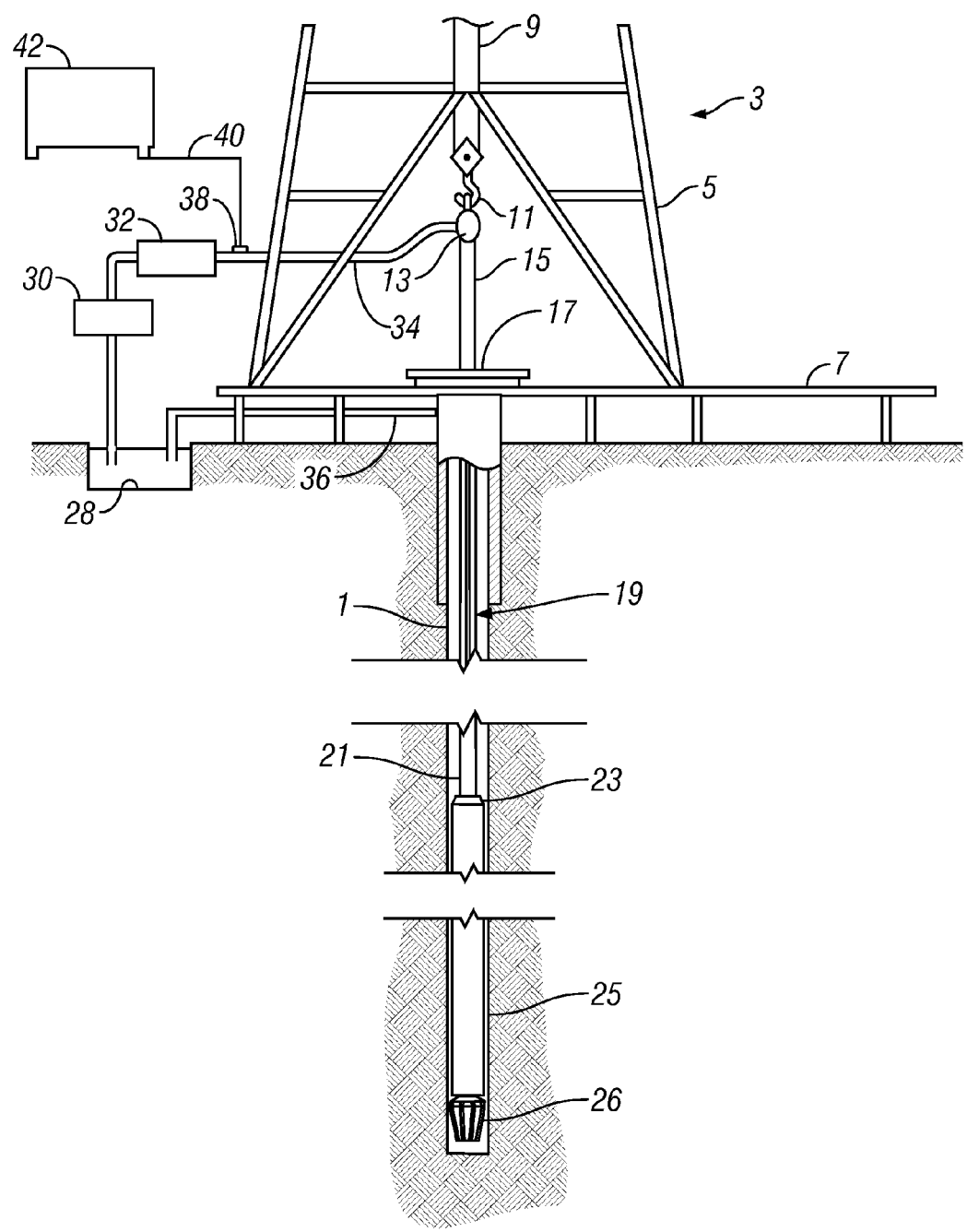
FIG. 1 is a simplified depiction of a drilling rig, a drillstring and a wellbore equipped with an apparatus for interrogating the borehole in accordance with the present disclosure.

With reference to FIG. 1, there will now be described an overall simultaneous drilling and logging system in accordance with one embodiment of the present disclosure. A well 1 is drilled into the earth under control of surface equipment including a rotary drilling rig 3. In accordance with a conventional arrangement, rig 3 comprises a derrick 5, derrick floor 7, draw works 9, hook 11, swivel 13, kelly joint 15, rotary table 17, and drill string 19 that comprises drill pipe 21 secured to the lower end of kelly joint 15 and to the upper end of a section of drill collars including an upper drill collar 23, an intermediate drill collar or sub (not separately shown), and a lower drill collar measurement tubular 25 immediately below the intermediate sub. A drill bit 26 is carried by the lower end of measurement tubular 25.

Drilling fluid (or "mud", as it is commonly called) is circulated from a mud pit 28 through a mud pump 30, past a desurger 32, through a mud supply line 34, and into swivel 13. The drilling mud flows down through the kelly joint 15 and an axial tubular conduit in the drill string, and through jets (not shown) in the lower face of the drill bit. The drilling mud flows back up through the annular space between the outer surface of the drill string and the inner surface of the borehole to be circulated to the surface where it is returned to the mud pit through a mud return line 36. A shaker screen (not shown) separates formation cuttings from the drilling mud before it returns to the mud pit.

The overall system of FIG. 1 uses mud pulse telemetry techniques to communicate data from downhole to the surface while drilling operation takes place. To receive data at the surface, there is a transducer 38 in mud supply line 34. This transducer generates electrical signals in response to drilling mud pressure variations, and these electrical signals are transmitted by a surface conductor 40 to a surface electronic processing system 42.

Figure 2:
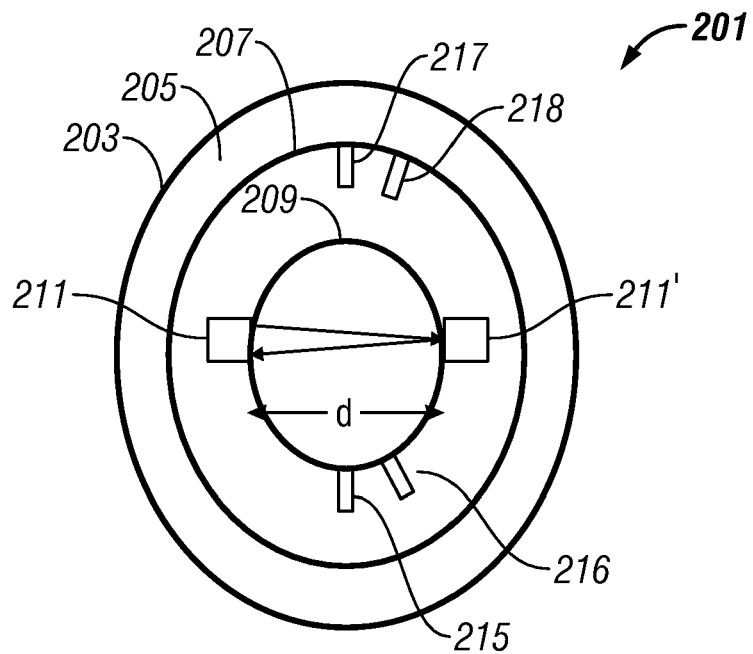
FIG. 2 is a schematic illustration of the sensor assembly.

Turning now to FIG. 2, depicted therein is a cross-section of the borehole 203 in an earth formation 203. The drill collar is denoted by 207 and annulus between the drill collar and the borehole wall is denoted by 205. At least one transducer 211, 211' is positioned in the mud channel 209 on the interior of the drill collar. In one embodiment of the disclosure, a single transducer 211 is used as a transmitter and a receiver, and an acoustic signal reflected from the opposite side of the channel at a distance 'd' is used to provide an estimate of the velocity of sound in the mud in the interior channel. The velocity is given by the relation $v=2d/\tau$, where $\tau$ is the two-way transit time across the mud channel, and v is the velocity. In an alternate embodiment of the invention, 211 is a transmitter and 211' is a receiver, and velocity is given by the relation $v=d/\tau'$ where $\tau'$ is a one-way transit time.

A particular advantage of this configuration is that the mud across which the pulse transmission is being made has been through the surface screen and hence does not have the drill cuttings to scatter and attenuate the acoustic pulse. Consequently, the signal received has a good signal-to-noise ratio, giving reliable estimates of the mud velocity. A disadvantage of this configuration is that caliper measurements require the use of a transducer on the exterior of the drill collar and the velocity of the mud in the annulus.

There are a number of steps that may be taken in the present disclosure to address this deficiency. First, a temperature sensor 215 and a pressure sensor 216 may be provided to make a measurement of the mud temperature and pressure downhole. From laboratory measurements, the mud density $\rho$ at a given temperature and pressure is a known quantity. Consequently, the bulk modulus $K_{int}$ of the drilling mud in the interior channel is given by the relationship:

$$K_{int}=\rho v^2 \qquad (1).$$

A measurement is made at the surface of a density $\rho_{surf}$ of the mud after it has passed through the screen and is thus substantially homogeneous. Again, using a lookup table, a temperature- and/or pressure-corrected estimate may be made of the density $\rho_{ext}$ of the homogeneous portion of the mud in the annulus. A suitable temperature sensor 217 and pressure sensor 218 may be provided on the outside of the drill collar to provide a temperature measurement and a pressure measurement of the mud in the annulus.

The interior and exterior densities will be different due to suspended fine-grain particles produced by the drilling action. These may be related by the equation:

$$\rho_{ext}=\phi\rho_g+(1-\phi)\rho_{int} \qquad (2),$$

Where $\phi$ is the volume fraction of the exterior mud occupied by fine-grain particles and $\rho_g$ is the grain density. The fine-grained particles have known mineralogy, density and bulk modulus: typically, they include quartz, calcite and clay minerals. Using the well-known Reuss averaging, the bulk modulus of the exterior mud may be given by $$K_{ext}^{-1}=\phi K_g^{-1}+(1-\phi)K_{int}^{-1} \qquad (3).$$

Note that in this formulation, large drill cuttings are assumed not to contribute to the velocity. From eqns. (2) and (3), the mud velocity in the homogenous portion of the exterior mud may be determined. This is the velocity that is of relevance for acoustic caliper measurements since at the frequencies involved, the large mud cuttings will not affect the velocity significantly. It is also possible to simply use the determined mud velocity, using temperature and/or pressure corrections, and use it for the caliper measurements.

Figure 3:
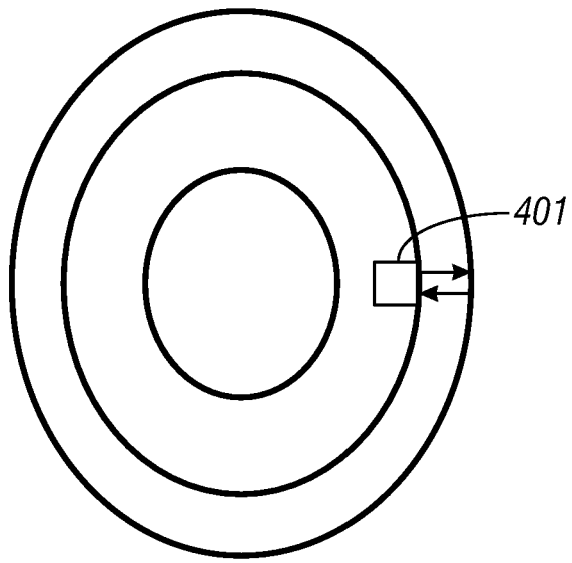
FIG. 3 illustrates an acoustic transducer on the exterior of the drill collar used for providing standoff measurements.

Turning now to FIG. 3, a transducer 401 mounted on the exterior surface of the drill collar is shown along with a reflected ray path from the borehole wall. The measurements in this transducer may be used to define standoff of the tool from the borehole wall using known methods and the determined velocity of sound in the mud.

As discussed in U.S. Pat. No. 6,618,322 to Georgi, having the same assignee as the present disclosure and the contents of which are incorporated herein by reference, washout causes some portions of the sensitive region for NMR measurements to lie outside the rock formation, therefore allowing borehole mud to contribute to the NMR signal. The length of the vertical aperture of the NMR device may be substantially greater than the length of the washout. It is also possible to have a cavity region large enough such that the entire depth of investigation along the vertical aperture lies completely within the borehole. In this situation, all of the received NMR signals would be due to the mud and none from the rock formation. To make a correct assessment of the effect of the washout on the NMR signal, it is necessary to determine the volume of the sensitive region which is occupied by mud as well as that volume which is occupied by the rock formation. To calculate these volumes, it is necessary to know the distances from points on the surface of the borehole wall to corresponding points on the surface of the NMR tool. The caliper measurements thus enable correction and compensation for the effects of borehole invasion of the NMR radius of investigation, or other effects on borehole due to variations in acoustic mud velocity and borehole standoff.

U.S. Pat. No. 7,129,477 to Schneider and U.S. Pat. No. 6,584,837 to Kurkoski having the same assignee as the present disclosure and the contents of which are incorporated herein by reference, teach the use of caliper measurements for correcting and analyzing density measurements made with a gamma ray source and gamma ray detectors to obtain a density image of the formation. NMR and nuclear sensor are examples of formation evaluation sensors whose measurements benefit by applying a correction for standoff.

The processing of the data may be accomplished by a downhole processor. Implicit in the control and processing of the data is the use of a computer program implemented on a suitable machine readable medium that enables the processor to perform the control and processing. The results of the processing may be recorded on a suitable medium. The machine readable medium may include ROMs, EPROMs, EAROMs, Flash Memories and Optical disks. Implicit in the disclosure is the recording or processed results where appropriate on a suitable medium.

While the foregoing disclosure is directed to the specific embodiments of the disclosure, various modifications will be apparent to those skilled in the art. It is intended that all such variations within the scope and spirit of the appended claims be embraced by the foregoing disclosure.

What is claimed is:

1. An apparatus for evaluating an earth formation, the apparatus comprising:
   a bottomhole assembly (BHA) configured to be conveyed into a borehole;
   at least one acoustic transducer in an interior channel of the BHA configured to make a measurement indicative of a value of a first velocity of a compressional waves in a fluid in the interior channel; and
   a processor configured to:
      use the measurement made by the at least one acoustic transducer to estimate a value of a second velocity of a compressional wave in a fluid in an annulus between the BHA and a wall of the borehole.

2. The apparatus of claim 1 further comprising:
   (i) a first temperature sensor configured to provide an output indicative of the temperature of the fluid in the interior channel, and
   (ii) a density measuring device configured to produce a measurement of a density of the fluid from the annulus at a surface location;
   wherein the processor is further configured to use the output of the first temperature sensor and the density measurement in estimating the value of the second velocity.

3. The apparatus of claim 1 further comprising an additional acoustic transducer on an exterior of the BHA configured to provide a measurement indicative of a standoff of the drilling tubular; and wherein the processor is further configured to estimate the standoff using the measurement of the additional acoustic transducer and the estimated value of the second velocity.

4. The apparatus of claim 3 further comprising at least one formation evaluation (FE) sensor configured to make a measurement indicative of a property of the earth formation, and wherein the processor is further configured to correct the measurement made by the FE sensor using the estimated standoff.

5. The apparatus of claim 4 wherein the at least one FE sensor is selected from the group consisting of: (i) a nuclear sensor, and (ii) a nuclear magnetic resonance sensor.

6. The apparatus of claim 1 wherein the processor is further configured to use an average of a fluid bulk modulus and a grain bulk modulus for estimating the value of the second velocity.

7. The apparatus of claim 1 wherein the at least one acoustic transducer comprises two acoustic transducers.

8. The apparatus of claim 1 further comprising a drilling tubular configured to convey the BHA into the borehole.

9. A method of evaluating an earth formation, the method comprising comprising:
   making a measurement indicative of a first velocity of a compressional wave in a fluid in an interior channel of a bottomhole assembly (BHA) in a borehole; and
   using the measurement indicative of the first velocity to estimate a value of a second velocity of a compressional wave in a fluid in an annulus between the BHA and a wall of the borehole.

10. The method of claim 9 wherein estimating the value of the second velocity further comprises:
    (i) making a measurement of a first temperature of the fluid in the interior channel, and
    (ii) using a measurement of a density of the fluid from the annulus at a surface location.

11. The method of claim 1 further comprising:
    (i) measuring an acoustic travel-time between the BHA and the wall of the borehole; and
    (ii) estimating a standoff of the BHA using the estimated value using the measured acoustic travel-time and the estimated value of the second velocity.

12. The method of claim 11 further comprising:
    (I) using at least one formation evaluation (FE) sensor to make a measurement indicative of a property of the earth formation, and
    (II) correcting the measurement made by the at least one FE sensor using the estimated standoff.

13. The method of claim 12 wherein the at least one FE sensor is selected from the group consisting of: (i) a nuclear sensor, and (ii) a nuclear magnetic resonance sensor.

14. The method of claim 9 wherein estimating the value of the second velocity further comprises using an average of a fluid bulk modulus and a grain bulk modulus.

15. The method of claim 9 further comprising using two acoustic transducers for the at least one acoustic transducer.

16. The method of claim 9 further comprising using a drilling tubular to convey the BHA into the borehole.

17. A non-transitory computer-readable medium product having thereon instructions that when read by a processor cause the processor to execute a method, the method comprising:
    using a measurement indicative of a first velocity of a compressional wave in an interior channel of a bottomhole assembly (BHA) conveyed in a borehole to estimate a value of a second velocity of a compressional wave between the BHA and a wall of the borehole.

18. The non-transitory computer-readable medium product of claim 17 further comprising instructions which enable the processor to use a temperature measurement of the fluid in the interior channel and a density measurement of the fluid from the annulus for estimating the value of the second velocity.

19. The non-transitory computer readable medium product of claim 17 further comprising at least one of: (i) a ROM, (ii) an EPROM, (iii) an EAROM, (iv) a flash memory, and (v) an optical disk.

* * * * *